Figure 1:
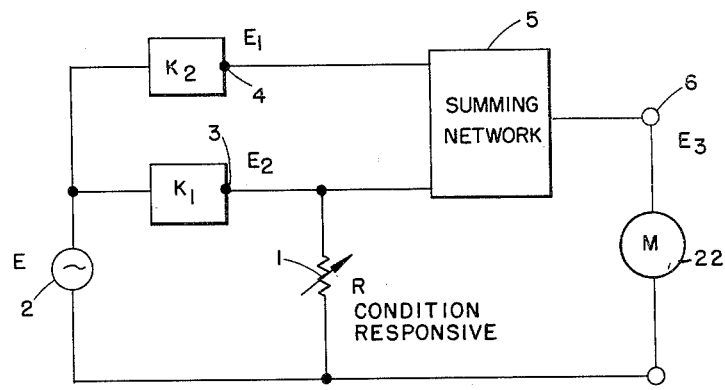

March 13, 1962     K. H. BEERS     3,025,466

IMPEDANCE MEASURING APPARATUS

Filed Jan. 24, 1958

INVENTOR.
KENNETH H. BEERS
BY *John A. Duffy*

AGENT

3,025,466
IMPEDANCE MEASURING APPARATUS
Kenneth H. Beers, Lakewood, Calif., assignor to
North American Aviation, Inc.
Filed Jan. 24, 1958, Ser. No. 711,032
1 Claim. (Cl. 324—62)

This invention relates to a measuring device and more particularly to a device for obtaining from an impedance device and an input potential a signal linearly proportional to the input potential and the change in impedance of the impedance device.

Devices for measuring the value of a varying condition by subjecting an impedance to the condition and measuring the resistance of the impedance are well-known. A common example is a temperature measuring device which measures the resistance of an impedance which is sensitive to changes in temperature. Changes in resistance of the impedance provide an accurate indication of the temperature changes, since resistors are available which vary in resistance value a substantially predetermined linear form with the temperature of the resistor. In order to measure the resistance change due to changes in temperature, an electrical output is provided proportional to the resistance by impressing a voltage across the resistor, with the resulting current being a function of the changing resistance.

A serious disadvantage to impedance measuring devices is that while the resistance of the impedance may be made to vary linearly with some independent variable, the electrical output signal, such as current, which measures the change in resistance does not vary linearly but in a nonlinear fashion according to the equation derived from Ohm's law, $I=E/R$, where the current I is varying hyperbolically with the resistance R. Accordingly, effective linearity cannot be achieved in present-day impedance measuring devices.

The device of this invention overcomes the above stated disadvantages by providing a simple and accurate circuit which generates a voltage proportional to the input voltage impressed across an impedance to be measured and the resistance of the impedance such that the output signal, measured as a voltage or a current proportional to the voltage, is directly proportional to the resistance of the impedance.

It is therefore an object of this invention to provide an improved impedance measuring device.

It is another object of this invention to provide an impedance measuring device which provides a linear output.

It is still another object of this invention to provide an impedance measuring device which obtains a linear signal from an impedance device which is varying linearly.

It is a further object of this invention to provide an impedance measuring device which provides a linear output from a linearly changing impedance.

It is a still further object of this invention to provide an impedance measuring device which provides an output signal which is varying linearly with a linearly varying impedance.

Figure 2:
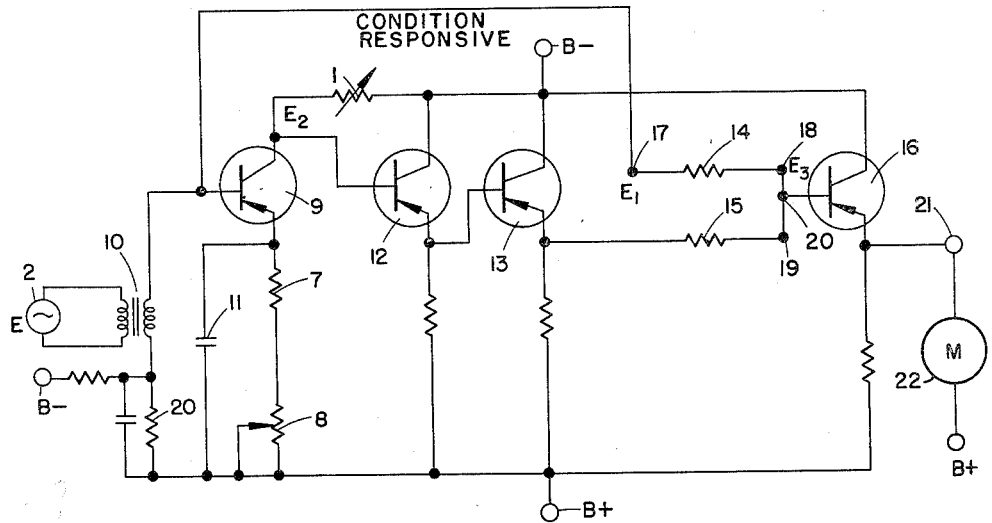

Other objects of this invention will become apparent from the following description taken in connection with the accompanying drawings, in which FIG. 1 is a block diagram illustrating the principal features of the invention; and, FIG. 2 is a circuit diagram of a circuit illustrating the invention.

Referring first to FIG. 1, there is shown in block form a diagram illustrating the principal features and theory of the device of this invention. Impedance device 1 is connected to vary linearly with some independent variable, such as temperature for example. Calling this variable T and the resistance of impedance device 1 R, there is obtained:

(1) $\quad R_1 = R_0(1 + \Delta T_1)$ where $R_1$ is the resistance at $T=T_1$, $R_0$ is the resistance at $T=T_0$ and $\Delta T_1$ is the change in variable $T_1-T_0$. This resistance change is to be detected as an electrical output linearly proportional to $\Delta T$. To provide an electrical current I through R, voltage source 2, denoted as E is provided which has one terminal connected through $K_1$ (to be described) to one end of R and its other terminal connected to the other end of R. $K_1$ is a predetermined constant generating device, for example an amplifier, which produces a voltage $E_2$ at terminal 3 which is equal to $IR_1$. Setting $K_1$ equal to I divided by E there is obtained $$E_2 = K_1 E R_1$$

Substituting the value of R obtained from Equation 1, Equation 2 is obtained:

(2) $\quad E_2 = K_1 E R_0 (1 + \Delta T_1)$

Predetermined constant generating device $K_2$ produces a voltage $E_1$ at terminal 4 equal to $K_2 E$. The voltages $E_1$ and $E_2$ are fed to summing means 5 which produces a voltage $E_3$ at terminal 6 as follows:

(3) $\quad E_3 = K_3 E_1 + K_4 E_2$ where $K_3$ and $K_4$ are constants of the summing network. Substituting $EK_2$ for $E_1$ and $K_1 E R_0 (1+\Delta T_1)$ for $E_2$ there is obtained:

(4) $\quad E_3 = K_3 K_2 E + K_4 K_1 E R_0 (1 + \Delta T_1)$

Simplifying, there is obtained:

(5) $\quad E_3 = E[(K_3 K_2 + K_4 K_1 R_0) + K_4 K_1 R_0 \Delta T_1]$

Now, by selecting the proper values of $K_1$, $K_2$, $K_3$, and $K_4$, there may be obtained:

(6) $\quad K_3 K_2 + K_4 K_1 R_0 = 0$

Substituting Equation 6 in Equation 5 there is obtained:

(7) $\quad E_3 = E K_1 K_4 R_0 \Delta T_1$

It may readily be seen from Equation 7 that when impedance device R is varying linearly with variable T and a voltage E is applied to the circuit, a voltage $E_3$ is obtained at output terminal 6 which is linearly proportional to $E R_0 \Delta T$. Therefore if the voltage $E_3$ is impressed across a constant resistance in a suitable meter, for example meter 22, a current may be obtained which is linearly proportional to $E \Delta T$.

Turning now to FIG. 2 there is shown a circuit diagram showing the complete mechanization of the principles explained and illustrated in FIG. 1. In FIG. 2 resistor 1 typifies impedance device R of FIG. 1 which is responsive to an independent variable, such as temperature. P-n-p transistor 9, together with resistors 7 and 8, provides the constant $K_1$ and produces the voltage $E_2$ described in relation to FIG. 1. The collector of transistor 9 is connected through resistor 1 to B— and the emitter of transistor 9 is connected through resistors 7 and 8 to B+. Transistor 9 receives a controlling signal at its base from alternating-current source 2 through transformer 10. Source 2 produces a voltage corresponding to the voltage E of FIG. 1. Direct-current bias conditions are provided by connecting B+ through resistor 20 to one end of the secondary of transformer 10. Capacitor 11 eliminates undesirable quadrature voltages embodied in the collector of transistor 9. Transistor 12 is connected to follow the voltage at the collector of transistor 9 and transistor 13 is connected as an emitter-follower of transistor 12. The base of transistor 9 is connected through resistor 14 to the base of output transistor 16. Resistor 14 produces the $K_3$ constant described in relation to FIG. 1. The emitter of transistor 13 is connected through resistor 15 to the base of transistor 16. Resistor 15 produces the $K_4$ constant described in FIG. 1. $K_2$ in FIG. 2 is equal to 1 by reason of the direct connection between the base of transistor 9 and resistor 14. Thus it is seen that the voltage $E_1$ in FIG. 1 is produced at point 17 in FIG. 2 and a signal component equivalent to $K_3E_1$ of Equation 3 is produced at point 18. Similarly, a signal component equivalent to $K_4E_2$ of Equation 3 is produced at point 19. Point 20, which is connected to the base of transistor 16 produces a signal proportional to $E_3$. This signal is reflected at output terminal 21 which is connected to the emitter of output transistor 16. A suitable meter 22 is connected between output terminal 21 and the B+ terminal to measure the voltage at the emitter of transistor 16.

It may readily be seen in the operation of the circuit of FIG. 2 that if resistor 1 is made to vary linearly with an independent variable such as temperature, a voltage is presented to output terminal 21 which is linearly proportional to the resistance of resistor 1 and the independent variable.

It is to be realized, of course, that the circuit of FIG. 2 is only one way of mechanizing the equations developed in the beginning of this specification and that many other ways, obvious to one skilled in the art, are equally possible in the light of the teaching of this specification. The constants $K_1$ through $K_4$ may be adjusted in any way desired as long as they conform to Equation 6. Other means besides transistors and resistors may be used to generate these constants.

Although the invention has been described and illustrated in detail, it is to be clearly understood that the same is by way of illustration and example only and is not to be taken by way of limitation, the spirit and scope of this invention being limited only by the terms of the appended claim.

I claim:

In combination, a first resistor connected to vary in a linear fashion in response to a condition, a first transistor amplifier having at least a collector, base, and emitter electrodes, means for establishing direct-current operating potentials on said emitter and collector electrodes, said base electrode responsive to an alternating-current voltage source, said first resistor connected in series with said collector electrode and one end of said direct-current operating potential supply means, a second transistor having at least a collector, base, and emitter electrodes, means for establishing direct-current operating potentials on the emitter and collector electrodes of said second transistor, the base of said second transistor connected to be responsive to the collector of said first transistor whereby said second transistor operates as a collector follower, third transistor having at least collector, emitter, and base electrodes, said third transistor receiving direct-current operating potentials from said direct-current supply means, second and third resistors having one end connected to the base of said third transistor, the other end of said second resistor connected to the base of said first transistor, and the other end of said third resistor connected to the emitter of said second transistor.

References Cited in the file of this patent
UNITED STATES PATENTS

| | | |
|---|---|---|
| 1,964,141 | Rhodes et al. | June 26, 1934 |
| 2,565,922 | Howard | Aug. 28, 1951 |
| 2,749,753 | Adams | June 12, 1956 |
| 2,771,579 | Ruge | Nov. 20, 1956 |
| 2,793,292 | Wolff | May 21, 1957 |
| 2,871,446 | Wann | Jan. 27, 1959 |